United States Patent

[11] 3,614,614

[72] Inventor Ronald L. Starliper
    Burlington, N.C.
[21] Appl. No. 847,962
[22] Filed Aug. 6, 1969
[45] Patented Oct. 19, 1971
[73] Assignee Western Electric Company, Incorporated
    New York, N.Y.

[54] METHOD AND CIRCUIT FOR MEASURING EFFECTIVE CAPACITANCE OF A SEMICONDUCTIVE DEVICE
12 Claims, 8 Drawing Figs.

[52] U.S. Cl. .................................................. 324/158 D,
                                                          324/60 C
[51] Int. Cl. ................................................ G01r 31/22,
                                                          G01r 27/26
[50] Field of Search ........................................ 324/158 D,
    158, 60, 60 B, 60 C, 60 CD; 307/320; 317/234 U A

[56] References Cited
UNITED STATES PATENTS
2,669,004  2/1954  Blair ........................... 324/158 X
3,054,055  9/1962  Lubkin ......................... 324/158
3,073,446  1/1963  Wilson et al. .................. 324/158 X
3,387,208  6/1968  Foley ........................... 324/60
3,387,211  6/1968  Kaufmann et al. ............... 324/158

Primary Examiner—Rudolph V. Rolinec
Assistant Examiner—Ernest F. Karlsen
Attorneys—H. J. Winegar, R. P. Miller and S. Gundersen ABSTRACT: The effective or DC junction capacitance of a semiconductive device, which varies as a function of voltage, is measured by simultaneously applying a charging voltage to the device to be measured and to a calibrated, standard value of capacitance. The voltage across the device, as successive pulses of charging voltage are applied thereto, is displayed on an oscilloscope. A voltage spike is also applied to the oscilloscope input from a differential voltage comparator when the voltage across the device is equal to the voltage across the standard capacitor. This voltage superimposes a spike on the oscilloscope trace of the device voltage. The voltage at which the spike occurs on the oscilloscope display is the voltage at which the effective device capacitance is equal to the standard capacitance. By varying the standard value of capacitance, the effective diode capacitance is read directly from the standard capacitance at various voltages as indicated on the oscilloscope display.

INVENTOR
R. L. STARLIPER
BY O. W. Marks
ATTORNEY

METHOD AND CIRCUIT FOR MEASURING EFFECTIVE CAPACITANCE OF A SEMICONDUCTIVE DEVICE

BACKGROUND OF THE INVENTION

1. Field of the Invention

The invention is directed to a method and circuit for measuring the effective capacitance of a semiconductive device having a PN junction. Since the capacitance of a semiconductive device, for example, a variable capacitance diode, varies as a function of reverse bias voltage across the device, it is often necessary to know the capacitance of a given device at a particular voltage in order to compensate for this capacitance in circuit design calculations. Further, it is often necessary to match the characteristics of a pair of semiconductive devices and, in order to accomplish this, the identity of the two capacitance-reverse voltage functions must be measured.

2. Description of the Prior Art

One of the principal ways in which device capacitance has been measured in the past is with a capacitance bridge having an internal bias source to maintain the reverse voltage across the capacitor at a preselected value. In order to obtain a plot of the capacitance of a device as a function of reverse voltage, it is necessary to take a series of readings at different bias voltage values. This process is very time consuming since the bias voltage must be reset and the capacitance bridge nulled for each reading.

SUMMARY OF THE INVENTION

In one embodiment of the invention, a method and circuit are contemplated wherein the effective capacitance of a semiconductive device having a capacitance value which varies as a function of the applied voltage, is measured by simultaneously charging the semiconductive device and a fixed value capacitor at a preselected rate and then producing an output signal when the voltage across the semiconductive device is equal to the voltage across the fixed value capacitor. The voltage value when the output signal is produced, is that at which the effective capacitance of the semiconductive device is equal to the capacitance of the fixed value capacitor.

DETAILED DESCRIPTION

Figure 1:
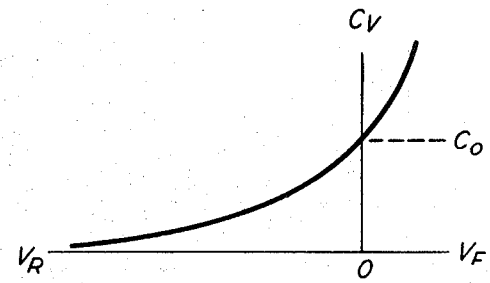
FIG. 1 is a graph of the capacitance versus voltage characteristic of a variable capacitance diode.

The capacitance across a PN junction found in a semiconductive device varies as a function of the voltage across the device. For example, FIG. 1 shows a plot of the characteristics of the capacitance $C_V$ of a variable capacitance diode as a function of the reverse voltage $V_R$ and the forward voltage $V_F$ across the diode. The capacitance $C_0$ has been expressed by the equation $C_V = C_0(1 + V_R/\Phi)^{1M}$ where $\Phi$ and $M$ are constants, depending upon the particular diode. The capacitance value at zero bias voltage $C_0$ is also a constant value and a characteristic of the particular diode. In order to determine the capacitance value $C_V$ at a particular reverse bias voltage condition, it has been necessary to extensively measure and plot the capacitance values as the reverse bias voltage is varied.

Figure 2A:
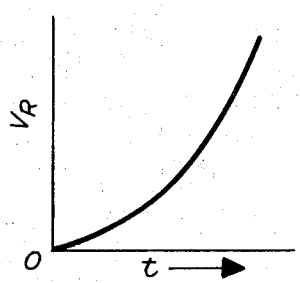
FIG. 2A is a graph of the voltage across a variable capacitance diode as a function of time when the diode is charged with a constant current.
Figure 2B:
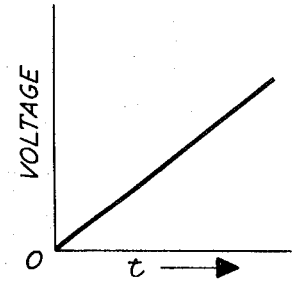
FIG. 2B is a graph of the voltage across a fixed value capacitor as a function of time when the capacitor is charged with a constant current.

When a variable capacitance diode is charged in a reverse direction by a source of constant current, the voltage in the reverse direction increases with time along an exponential curve as shown in FIG. 2A. A fixed value capacitance, on the other hand, charges at a constant rate with time as shown in FIG. 2B. The differences in these curves is due, of course, to the fact that as shown in FIG. 2A, the capacitance value of the diode is decreasing as the reverse voltage to which the diode is charged increases. The pure capacitance of FIG. 2B, however, remains at a constant value and hence the voltage to which it is charged changes in a linear fashion with time.

Figure 3:
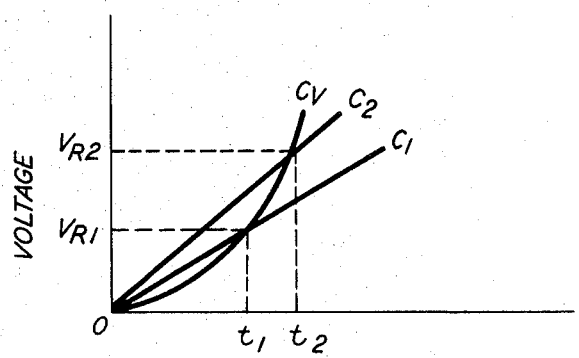
FIG. 3 is a composite graph of FIGS. 2A and 2B for two different values of a constant value capacitor.

FIG. 3 is a graph formed by superimposing the charging characteristics of the variable capacitance diode of FIG. 2A and the pure capacitance of FIG. 2B for two selected different values of fixed capacitance. The values of the capacitors $C_1$ and $C_2$ are selected so that the curve $C_V$ crosses the curves $C_1$ and $C_2$ at times $t_1$ and $t_2$, respectively, when the same constant charging current is applied to each capacitance. It has been mathematically and experimentally determined that at the crossover points, the variable capacitance $C_V$ is equal to the capacitance of the respective fixed capacitor $C_1$ or $C_2$.

Figure 4:
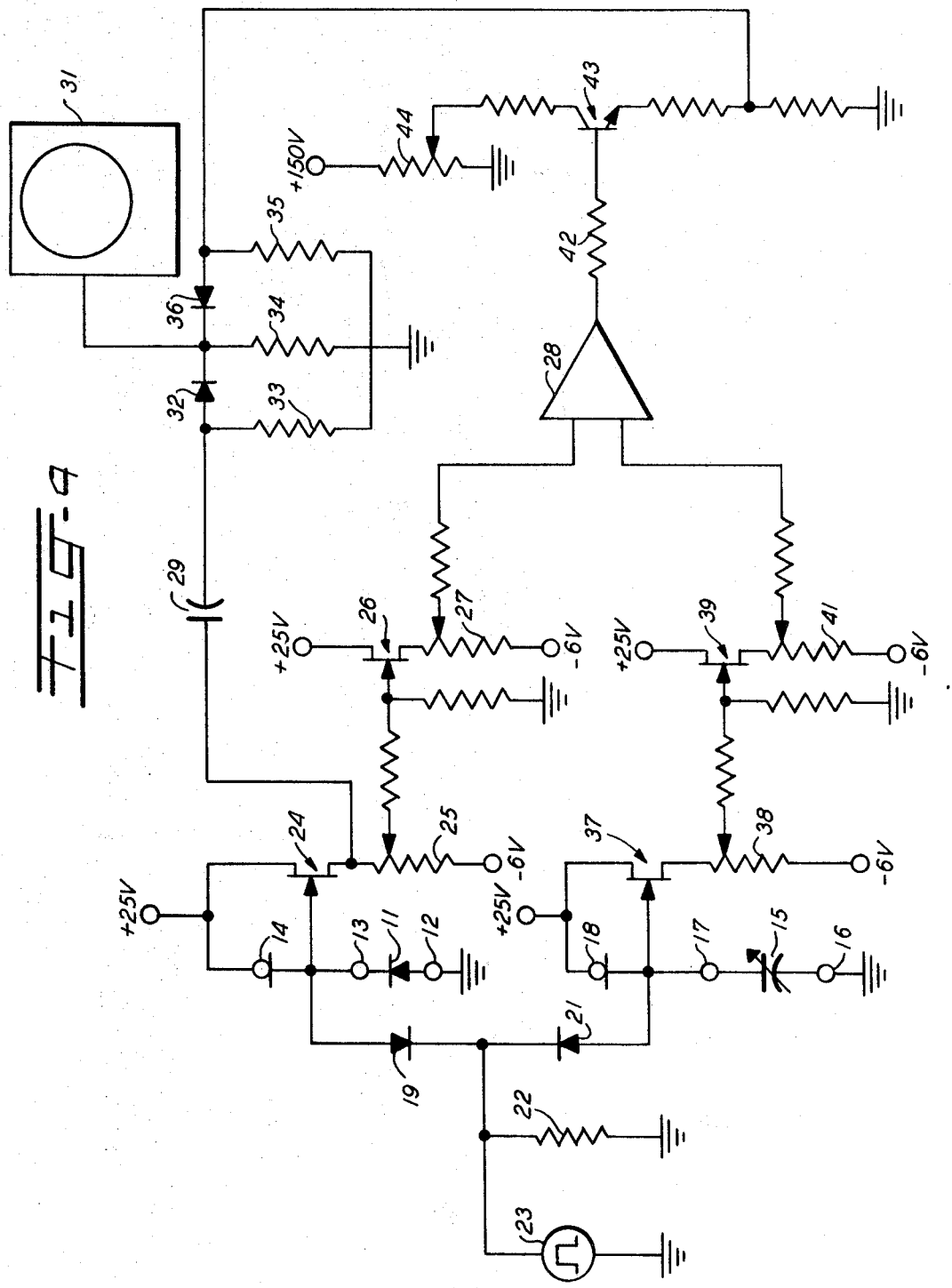
FIG. 4 is a schematic diagram of a circuit for measuring effective device capacitance at a preselected voltage in accordance with one embodiment of the invention.

FIG. 4 is a schematic diagram showing a circuit which utilizes the principle illustrated in FIG. 3 to quickly measure the effective capacitance versus reverse voltage characteristics of a semiconductive device. The effective capacitance measured is the DC capacitance of the device which may be slightly higher in value than the AC capacitance measured under sine wave conditions, due to the characteristics of a PN junction. A semiconductive device whose characteristic is to be measured, such as a variable capacitance diode 11 is connected between a pair of test terminals 12-13, one of which 12 is grounded and the other of which 13 is connected to one terminal of a first constant current, field-effect diode 14. The other terminal of the constant current field-effect diode is connected to a constant positive 25 volt source. A standard, variable capacitor 15 is similarly connected between a second pair of test terminals 16-17, one of which 16 is grounded and the other of which 17 is connected to a second constant current field-effect diode 18 which is connected, in turn, to a positive 25-volt source. A pair of shunt diodes 19 and 21 are connected from an input resistor 22, one terminal of which is grounded to the respective junctions between the first constant current diode 14 and the diode under test 11 and between the second constant current diode 18 and the standard capacitor 15. When there is no voltage across the input resistor 22, the shunt diodes 19 and 21 are forward biased by current from the 25-volt sources through the respective constant current diodes 14 and 18 so that the voltages across the respective test terminals 12-13 and 16-17 remain near zero. The voltage at these two points is about +0.4 volts due to the forward voltage drop of diodes 19 and 21 since they are conducting. However, when a pulse generator 23 supplies a positive input pulse across the input resistor 22, the shunt diodes 19 and 21 are reverse biased and the constant current diodes 14 and 18 begin to supply charging current, respectively, to the diode under test 11 and the standard capacitor 14.

The voltage across terminals 12-13 is coupled to the gate of a first high input impedance, high gain field-effect transistor 24 which is biased by the positive 25-volt source and a negative 6-volt source. The output of the transistor 24 is connected through a variable tapped resistor 25 to a first buffer field-effect transistor 26 which is in turn connected through a tapped resistor 27 to a first input of a differential comparator 28. The output of the first high gain field-effect transistor 24 is also connected through a coupling capacitor 29 to an oscilloscope 31 through a first input diode 32 of a coupling network comprising resistors 33, 34 and 35 connected in parallel and input diodes 32 and 36.

The voltage across the terminals 16–17 is connected to a second high input impedance, high gain field-effect transistor 37 which has a gain characteristic as nearly identical as possible to that of field-effect transistor 24. The output of field-effect transistor 37 is coupled through a variable taped resistor 38 to a second buffer field-effect transistor 39 which is in turn connected through a tapped resistor 41 through a second input of the differential comparator 28. The comparator is of the type which produces no output voltage until the respective voltages on its two input terminals are above a certain threshold value and are precisely equal. When the voltages are equal, the differential comparator 28 produces an output voltage which is coupled through a resistor 42 to the base of a transistor 43 which is biased by a resistive network, a variable tapped resistor 44, and a positive 150-volt source. The transistor 43 is operated in the avalanche mode so that when the leading edge of the output voltage from the comparator 28 is coupled to the transistor 43, an output voltage spike is produced and coupled through the second input diode 36 of the coupling network to the oscilloscope 31.

Before operation, the circuit of FIG. 4 is first calibrated by adjusting resistors 25 and 38 so that the voltage delivered to the buffer transistors 26 and 39 is zero when there is no signal from the generator 23. Similarly, resistors 27 and 41 are adjusted so that signals to the comparator 28 are zero when the output of the generator 23 is zero. The variable tapped resistor 44 is adjusted so that when transistor 43 is triggered by the comparator 28, a voltage spike of the required amplitude is generated on the oscilloscope 31, as shown in FIG. 6.

In operation of the circuit of FIG. 4, the generator 23 is energized to produce a series of square wave pulses around +6.5 volts in amplitude, 4 microseconds in width, ad at a rate of 5 kHz. During the period that the input source 23 is producing a positive voltage to back bias the blocking diodes 19 and 21, the device under test 11 and the standard capacitor 15 are charged by equal, constant currents from the diodes 14 and 18. The rising voltage across the device 11 is coupled to the field-effect transistor 24 and the amplified voltage across the diode is displayed as an exponentially increasing voltage upon the screen of the oscilloscope 31. As the capacitor 15 is also charged, its voltage is amplified by the field-effect transistor 37 and the respective voltages across the diode 11 and the capacitor 15 are coupled through buffer transistors 26 and 39 to the differential comparator 28. When the values of voltage across the two capacitances 11 and 15 are equal, the comparator 28 generates an output voltage and the transistor 43 produces a voltage spike which appears superimposed upon the exponentially increasing voltage on the oscilloscope display. At the end of each successive pulse from the generator 23, the blocking diodes 19 and 21 conduct to discharge the voltages upon the diode 11 and the capacitor 15 so that the charging cycle may be repeated at 5 kHz.

Figure 6:
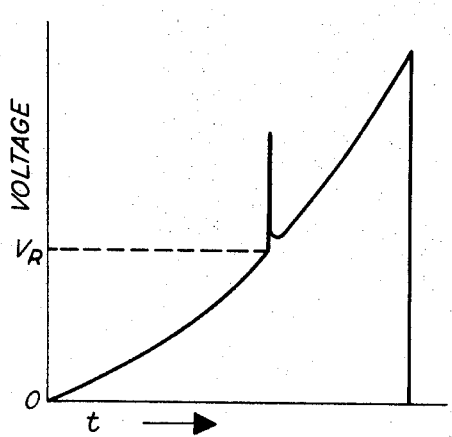
FIG. 6 is a graph of waveforms displayed upon the oscilloscope in the circuit shown in FIG. 4 during operation.

In FIG. 6, it may be seen that the voltage value at which the spike appears upon the exponential trace is the voltage value at which the effective capacitance of the diode under test is exactly equal to the standard capacitance 14. By varying the value of the standard capacitance 14, the respective voltages at which the diode assumes the corresponding value of effective capacitance may be read directly from the oscilloscope trace. In this manner, various values of plots of capacitance versus reverse voltage for a semiconductive device may be readily obtained.

Figure 5:
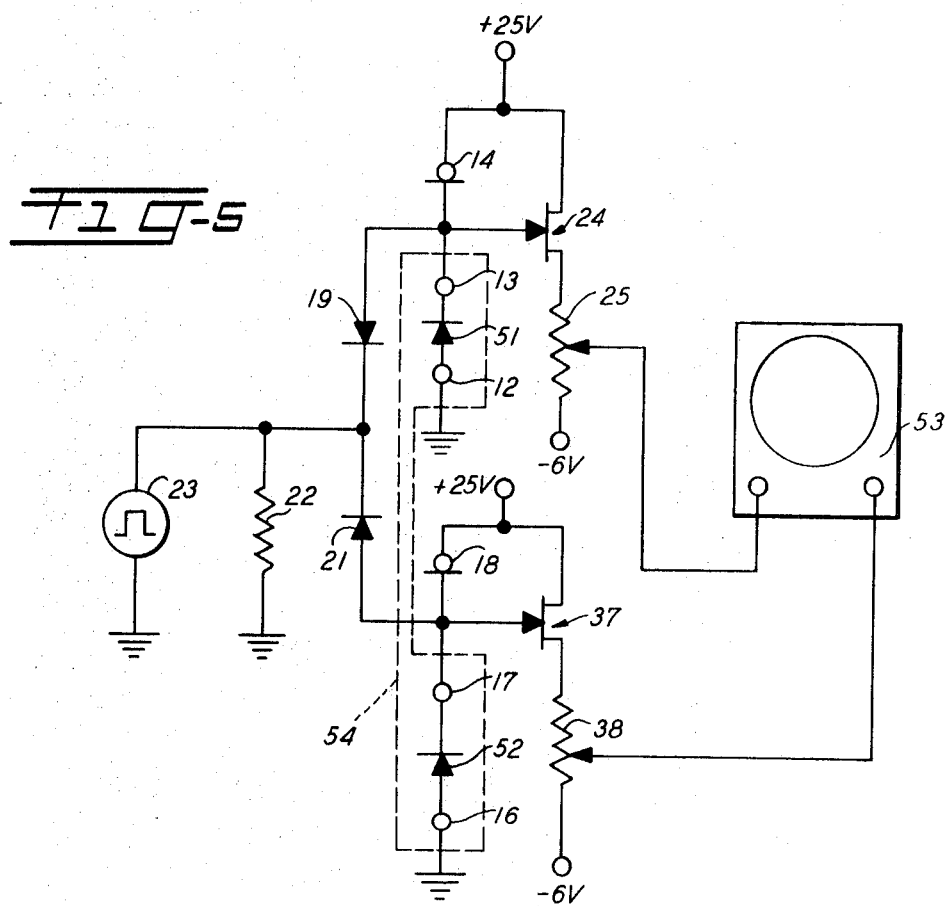
FIG. 5 is a schematic diagram of a circuit for comparing the electrical characteristics of a pair of devices constructed in accordance with the invention.

Referring to FIG. 5, a circuit is shown in which a pair of selected semiconductive devices may be compared for matching capacitance versus reverse voltage characteristics. A first device 51 is connected between a first set of terminals 12–13, one of which 12 is grounded, the other of which 13 is connected to one terminal of a constant current, field-effect diode 14 which is coupled to a positive 25-volt source. The other device 52, to which the first device 51 is to be compared, is similarly connected between a pair of test terminals 16–17, one of which 16 is grounded, the other of which 17 is connected to a second constant current, field-effect diode 18 coupled to a positive 25-volt source. A pair of blocking diodes 19 and 21 are connected, respectively, from an input resistor 22 to the junction to between the constant current diode 14 and the first device under test 51 and to between the constant current diode 18 and the second device under test 52. When there is no positive input voltage from the input pulse source 23, the voltage across the devices 51 and 52 are held near zero through conduction of the blocking diodes 19 and 21 and the input resistor 22.

The voltage across the first device under test 51 is coupled to the gate of a high input impedance, high gain field-effect transistor 24 while the voltage across the second device under test 52 is connected to the gate of a second high input impedance, high gain field-effect transistor 37. The outputs of the transistors 24 and 37 are connected, respectively, through variable tapped resistors 25 and 38 to the separate inputs of a dual trace oscilloscope 53. When there is no output from the generator 23, the resistors may be adjusted so that there is no voltage delivered to either inputs of the oscilloscope 53.

Figure 7:
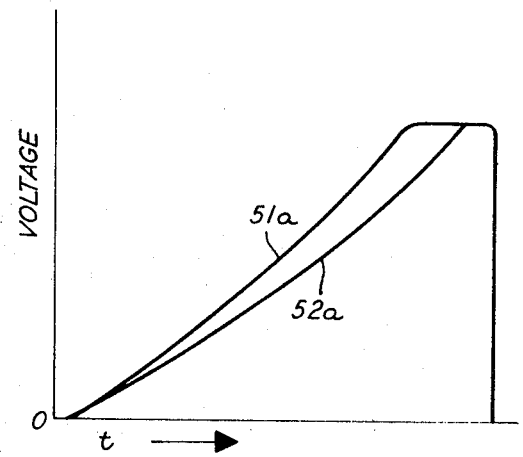
FIG. 7 is a graph of waveforms displayed upon the oscilloscope in the circuit shown in FIG. 5 during operation.

In operation, when the input pulse source 23 produces a positive pulse, the blocking diodes 19 and 21 are reverse biased to allow the constant current diodes 14 and 18 to charge the capacitive components of the two devices under test 51 and 52. As the voltages across the two devices increase with time, their exponential characteristics 51a and 52a are displayed on the oscilloscope 53 as shown in FIG. 7. The two exponential curves illustrate the accuracy with which the voltage-capacitance characteristics of the two devices 51 and 52 are matched. This display eliminates the necessity of plotting the voltage-capacitance characteristics of the two devices and enables the direct comparison of their characteristic. The dotted outline 54 enclosing the two devices 51 and 52 is illustrative of a closed environment within which the two devices may be enclosed during the test. For example, it may be desirable to compare the characteristics of the two devices as the temperature within the environment is varied to extend over actual operating conditions to which a circuit may be subjected. It is to be understood that such environmental variation conditions also be incorporated into the circuit, shown in FIG. 4, so that the exact operating conditions of a semiconductive device would be simulated during the measurement of its characteristics.

What is claimed is:

1. A method of measuring the effective capacitance of a semiconductive device having a capacitance value which varies as a function of the applied voltage comprising the steps of:

charging said semiconductive device at a preselected rate;
    simultaneously charging a fixed value capacitor at said preselected rate;
    comparing the respective voltages across said semiconductive device and said fixed value capacitor; and
    generating an output signal when the voltage across the semiconductive device is equal to the voltage across the fixed value capacitor to indicate that the effective capacitance of the semiconductive device at that voltage has a predetermined relationship to the capacitance of the fixed value capacitor.

2. A method of measuring the effective capacitance of a semiconductive device having a capacitance value which varies as a function of the applied voltage, as defined in claim 1, wherein said fixed value capacitor may be successively selectively set at various known, fixed values to obtain the overall capacitance-voltage characteristic of the semiconductive device by successively measuring corresponding voltage values at different capacitances.

3. A method of measuring the effective capacitance of a semiconductive device having a capacitance value which varies as a function of the applied voltage, as defined in claim 1, which also includes:

displaying the waveform of the voltage across said semiconductive device on an oscilloscope as said device is being charged; and superimposing a spike upon said waveform display in response to the generation of said output signal to indicate the voltage on said waveform at which the effective capacitance of said semiconductive device has the predetermined relationship to the capacitance of said fixed value capacitor.

4. A method of measuring the effective capacitance-voltage characteristic of a semiconductive device having a capacitance value which varies as a function of the applied voltage, comprising the steps of:

successively charging said semiconductive device at a preselected rate and then discharging said device;

simultaneously successively charging a variable capacitor, having a capacitance value which does not vary as a function of the applied voltage, at said preselected rate and then discharging said capacitor;

comparing the respective voltages across said semiconductive device and said capacitor during each one of the successive charging cycles;

generating an output signal during each of the successive charging cycles when the voltage across the semiconductive device is equal to the voltage across the capacitor to indicate that the effective capacitance of the semiconductive device at that voltage is substantially equal to the capacitance of the capacitor; and varying the capacitance of said variable capacitor during selected ones of the successive charging cycles to obtain voltage values at various capacitance values and ascertain the capacitance-voltage characteristic of the semiconductive device.

5. A method of measuring the effective capacitance-voltage characteristic of a semiconductive device having a capacitance value which varies as a function of the applied voltage, as defined in claim 4, which also includes:

displaying the waveform of the voltage across said semiconductive device on an oscilloscope as said device is being charged; and superimposing a spike upon said waveform display in response to the generation of said output signal to indicate the various voltage values on said waveform at which the effective capacitance of said semiconductive device is then equal to the then selected capacitance value of the variable capacitor to indicate the capacitance-voltage characteristic of the semiconductive device on the oscilloscope display as the value of the capacitor is varied.

6. A circuit for measuring the effective capacitance of a semiconductive device having a capacitance value which varies as a function of the applied voltage, comprising:

means for charging said semiconductive device at a preselected rate;

means for simultaneously charging a fixed capacitor value at said preselected rate;

means for comparing the respective voltages across said semiconductive device and said fixed value capacitor; and means for generating an output signal when the voltage across the semiconductive device is equal to the voltage across said fixed value capacitor to indicate that the effective capacitance of the semiconductive device at that voltage has a predetermined relationship to the capacitance of the fixed value capacitor.

7. A circuit for measuring the effective capacitance of a semiconductive device having a capacitance value which varies as a function of the applied voltage, as defined in claim 6, wherein:

said fixed value capacitor may be selectively set at various known fixed values of capacitance to obtain the overall capacitance-voltage characteristic of the semiconductive device by successively measuring the voltage equality values at different capacitances.

8. A circuit for measuring the effective capacitance of a semiconductive device having a capacitance value which varies as a function of the applied voltage, as defined in claim 6, which also includes:

means for displaying the waveform of the voltage across said semiconductive device as said device is being charged; and means for superimposing a spike upon said waveform display in response to the generation of said output signal to indicate the voltage on said waveform display at which the capacitance of said semiconductive device has the predetermined relationship to the capacitance of said fixed value capacitor.

9. A circuit for measuring the effective capacitance of a semiconductive device having a capacitance value which varies as a function of the applied voltage, as described in claim 7, wherein:

said means for charging said semiconductive device and the fixed value comparator include constant-current, field-effect diodes; and said means for comparing includes a differential comparator.

10. A circuit for measuring the effective capacitance-voltage characteristic of a semiconductive device having a capacitance value which varies as a function of the applied voltage, comprising:

means for successively charging said semiconductive device at a preselected rate and then discharging said device;

a variable capacitor having a capacitance value which does not vary as a function of the applied voltage;

means for simultaneously, successively charging said variable capacitor at said preselected rate and then discharging said capacitor;

means for continuously comparing the respective voltages across said semiconductive device and said comparator during each one of the successive charging cycles;

means for generating an output signal during each of the successive charging cycles when the voltage across the semiconductive device is equal to the voltage across the comparator to indicate that the comparator of the semiconductive device at that voltage is equal to the capacitance of the comparator; and means for varying the capacitance of said variable comparator during selected ones of the successive charging cycles to obtain voltage values at various capacitance values and ascertain the capacitance-voltage characteristic of a semiconductive device.

11. A circuit for measuring the effective capacitance-voltage characteristic of a semiconductive device having a capacitance value which varies as a function of the applied voltage, as defined in claim 10, wherein:

said means for successively charging said semiconductive device and said capacitor and then discharging said semiconductive device and said capacitor includes a pair of matched constant-current, field-effect diodes which are respectively connected to the device and to the capacitor to continuously supply constant, equal amounts of current which is alternately connected to the ground potential and then to the device and the capacitor.

12. A circuit for measuring the effective capacitance-voltage characteristic of a semiconductive device having a capacitance value which varies as a function of the applied voltage, as defined in claim 10, which also includes:

means for displaying the waveform of the voltage across said semiconductive device as said device is being charged through successive ones of the charging cycles; and means for superimposing a spike upon said waveform display in response to the generation of said output signal to indicate the voltage values at various capacitance values and directly display the capacitance-voltage characteristic of the semiconductive device on the display screen.